Dec. 27, 1960           O. L. LOOKER           2,966,066
FORCE-APPLYING OVER-CENTER TOGGLE MECHANISM
Filed May 27, 1957
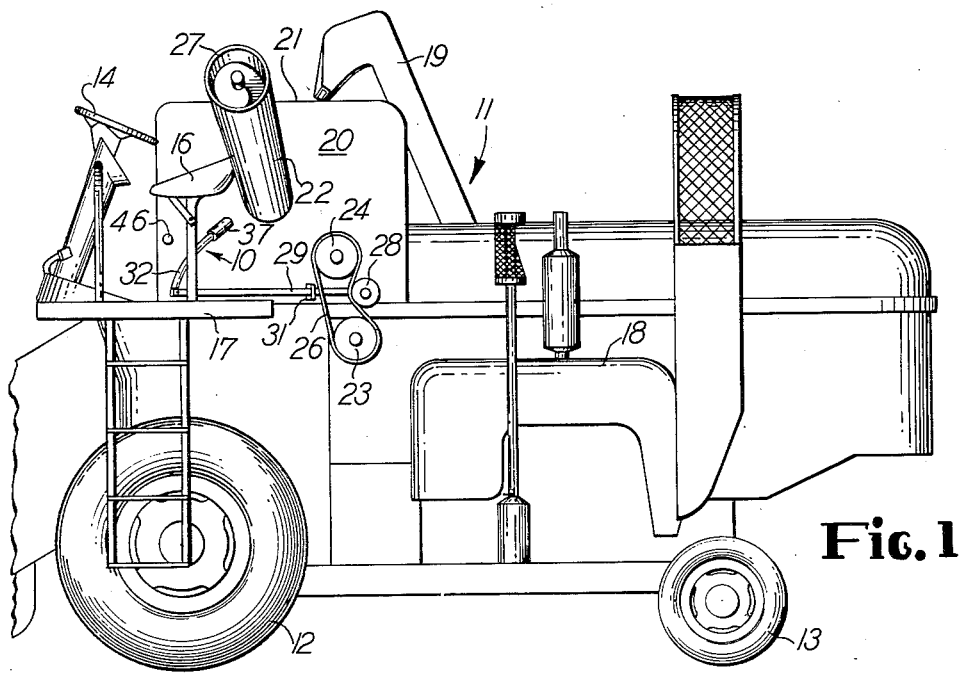
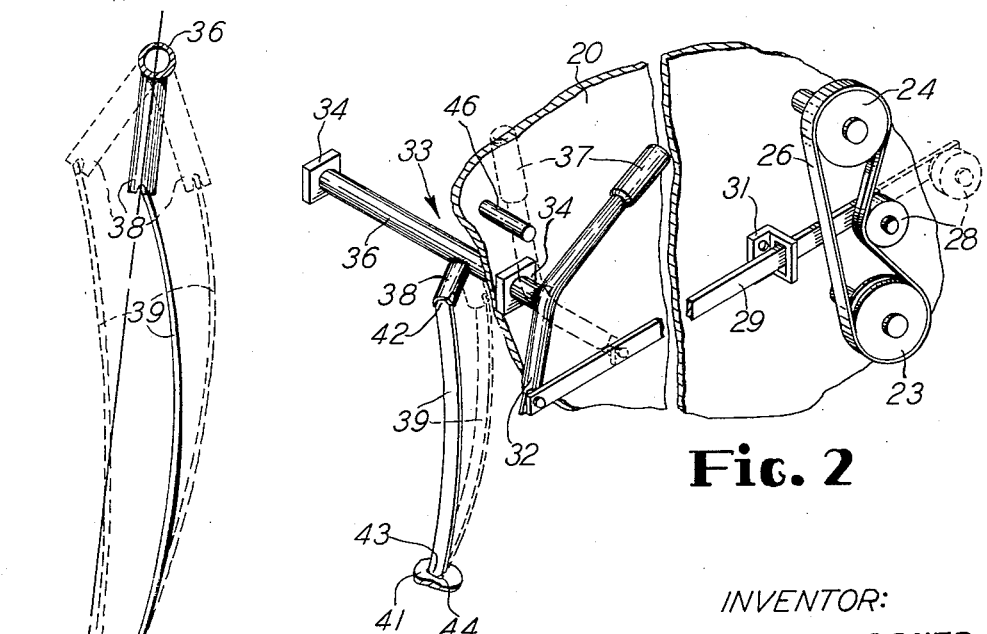
INVENTOR:
OLIN L. LOOKER
BY: *Emerson B Donnell*
ATTORNEY

United States Patent Office 2,966,066
Patented Dec. 27, 1960

2,966,066

FORCE-APPLYING OVER-CENTER TOGGLE MECHANISM

Olin L. Looker, Bettendorf, Iowa, assignor to J. I. Case Company, Racine, Wis., a corporation of Wisconsin Filed May 27, 1957, Ser. No. 661,681

1 Claim. (Cl. 74—242.1)

This invention relates to a force-applying over-center toggle mechanism of a resilient type. Application of this invention has been made in toggle mechanisms employed to exert a resilient force on an idler pulley of a V-belt power drive. Thus, the invention is described with that power transmission and particularly in connection with its use on an agricultural combine.

It is an object of this invention to provide an inexpensive and effective mechanism for resiliently urging a force-applying over-center toggle mechanism into one or the other of two possible positions.

Another object of this invention is to provide a resilient toggle-type mechanism wherein the force exerted thereby remains substantial over a considerable range in the operative position of the idler pulley.

Still another object of this invention is to provide a mechanism supporting an idler pulley and for selectively and resiliently pressing against a pulley belt, and with the mechanism being controlled from a remote point and particularly adaptable for use on an agricultural combine.

Other objects and advantages will become apparent upon reading the following description in light of the accompanying drawings, wherein:

Fig. 1 is a side elevational view of a combine, with parts broken away and incorporating a preferred embodiment of this invention.

Fig. 2 is an enlarged perspective view of said embodiment shown in Fig. 1 with parts of said combine included, and showing in dotted lines a second position of said embodiment.

Fig. 3 is an enlarged diagrammatic side sectional view of parts of said embodiment and showing in dotted lines two other positions of said parts.

The same reference numerals refer to the same parts among the several views.

Fig. 1 shows the embodiment of the invention, generally designated 10, attached to a combine 11. The latter includes the usual ground wheels 12 and 13, steering wheel 14, operator's seat 16, and the operator's platform 17. Also shown are the usual engine 18, grain elevator 19, grain bin 21, and the usual auger conveyor 22 projecting through the plate 20 of the grain bin 21. A driving pulley 23 and a driven pulley 24 are rotatably mounted on the side of the combine with the usual V-belt 26 trained between the pulleys. These pulleys in the present instance provide the drive to the auger conveyor 22 in the well-known manner and for the well-known purpose of conveying grain from the bin 21 to the outlet 27 on the near side of the auger conveyor 22. This drive is conventional and need not, therefore, be described more fully since the embodiment of this invention can be fully described without further reference to the combine. It should be understood that the grain is periodically conveyed through the conveyor 22 and into a wagon (not shown) which is positioned from time to time beneath the outlet 27. This invention is concerned with the mechanism for inducing the periodic action of the auger conveyor 22.

An idler pulley 28 is rotatably mounted on one end of a bar 29 which positions the pulley 28 in alignment with the V-belt 26 for the usual purpose of pressing against the belt to increase the tautness and cause it to rotate one of the pulleys 23 and 24 from the other. The pulley 28 can be selectively placed in either position shown in Fig. 2 as the bar 29 can be slid axially through a bracket 31 attached to the side of the combine. The other end of the bar 29 is pinned to an arm 32 of a lever assembly 33 pivotally mounted on the combine through stationary bearings 34 shown in Fig. 2. It will be understood that the bearings 34 are mounted on the combine in any conventional manner to support the assembly from a fixed position. Thus, pivotal movement of the assembly 33 induces axial movement of the bar 29, sliding it through racket 31 for the selective positioning of the pulley 28 in the full-line operative position and the dotted-line inoperative position. The action of the lever assembly and its related parts is the important feature of this invention.

A rock shaft 36 is the part of the assembly that is rotatably mounted in the bearings 34 and the arm or projection 32 is rigidly attached, as by welding as shown, to the shaft to rotate therewith. A handle 37 is shown as an extension of the arm 32, and together they form a lever rotatable with the shaft 36. Another arm or projection 38 is also attached to the shaft 36 and extends transversely thereto and rotates with the shaft. It will be noticed that the arm 38 is shorter than the arm 32, and there is a lever advantage in the actuation of the handle 37 since the latter is longer than the arm 32 which in turn is longer than the arm 38.

A normally straight and flat spring 39 is disposed in a slightly sprung condition between the end of the arm 38 and a base 41 stationarily mounted on the combine 11 in any conventional manner to provide a fixed support for the spring. The arm end is shown to be notched for receiving a pointed end 42 of the spring, and, similarly, the opposite end 43 of the spring is pointed for reception in an opening 44 in the base 41. In this manner, the spring 39 is pivotally disposed between the arm and the base as both ends of the spring are free to turn in their supports as described.

Fig. 3 shows in solid lines the dead-center spring position when the spring ends 42 and 43 and the shaft axis fall on a straight line, as shown. The operative position of the spring, as shown in solid lines in Fig. 2, is the same as the Fig. 3 dotted-line left side position, and the Fig. 3 dotted-line right side position is the inoperative position which is the Fig. 2 dotted line position. A stop 46 is fixedly attached to the plate 20 to abut the handle 37 in the inoperative position and retain the assembly. The endwise force exerted by the spring 39 on the arm 38 in the inoperative position of the idler assembly will positively hold the idler pulley 28 out of engagement with the belt 26. Of course, in the operative position, the idler pulley bears against the belt 26 and thus limits the straightening of the spring 39. The force of the pulley 28 on the belt 26 is substantially constant regardless of belt size or stretch because the spring exerts its endwise force against the arm 38 which, as the arm 38 is rotated clockwise, as seen in Figs. 2 and 3, it presents an increased torque arm about shaft 36.

This arrangement not only provides for a positive belt slack takeup, but eliminates the necessity of providing other means of compensating for belt size irregularities and belt stretch due to wear. Also, as mentioned in the objects, since the spring 39 is flat instead of being coiled, it is less expensive and easy to install and service.

While a specific embodiment of this invention has been shown and described, it should be obvious that certain changes could be made, and the invention should, therefore, be limited only by the scope of the appended claim.

What is claimed is:

A spring biased lever for use with a belt drive of the type comprising a pair of pulleys, a belt trained about said pulleys, and an idler pulley, the combination of a member movably mounted for supporting said idler pulley in selected positions bearing against and spaced from said belt, a lever assembly including a rock shaft rotatably mounted and connected to said member for movement to lever positions corresponding to said selected positions of said member for inducing movement of said member, said lever assembly including an arm fixed transversely to said rock shaft, a base disposed in a fixed position spaced from said shaft in the direction of said arm, and a flat spring compressed in endwise abutment between said arm and said base for yieldingly urging said assembly toward said lever positions.

References Cited in the file of this patent

UNITED STATES PATENTS

| | | |
|---|---|---|
| 1,437,702 | Alkan | Dec. 5, 1922 |
| 1,650,668 | Travers | Nov. 29, 1927 |
| 1,835,982 | Hammerly | Dec. 8, 1931 |
| 2,031,738 | Schoch | Feb. 25, 1936 |
| 2,177,052 | Blough | Oct. 24, 1939 |
| 2,289,137 | Matter | July 7, 1942 |
| 2,367,466 | Loy | Jan. 16, 1945 |
| 2,592,357 | Trainor | Apr. 8, 1952 |

FOREIGN PATENTS

| | | |
|---|---|---|
| 748,776 | France | Apr. 25, 1933 |
| 543,423 | Great Britain | Feb. 25, 1942 |